United States Patent
van de Venne et al.

[11] Patent Number: 5,519,743
[45] Date of Patent: May 21, 1996

[54] PRIMARY COOLANT SYSTEM OF A NUCLEAR POWER PLANT FOR PROVIDING COOLANT TO A PRIMARY LOOP

[75] Inventors: Theo van de Venne, Murrysville; Timothy K. Meneely, Penn Hills; Levi I. Ezekoye, Pittsburgh; Thomas J. Laubham, Irwin, all of Pa.

[73] Assignee: Westinghouse Electric Corporation, Pittsburgh, Pa.

[21] Appl. No.: 298,967

[22] Filed: Sep. 2, 1994

[51] Int. Cl.$^6$ .................................. G21C 15/18
[52] U.S. Cl. ........................................ 376/282
[58] Field of Search ...................... 376/282, 307, 376/299, 277

[56] References Cited

U.S. PATENT DOCUMENTS

| | | | |
|---|---|---|---|
| 1,047,769 | 12/1912 | East et al. | 236/101 R |
| 3,594,675 | 6/1971 | Wilson | 337/140 |
| 4,046,626 | 9/1977 | Winkler et al. | 376/282 |
| 4,064,002 | 12/1977 | Desmarchais et al. | 376/282 |
| 4,523,605 | 6/1985 | Ohkata | 137/62 |
| 4,570,851 | 2/1986 | Cirillo | 236/93 |
| 4,836,443 | 6/1989 | Wolters et al. | 236/92 |
| 5,141,153 | 8/1992 | Jeffress | 236/93 B |
| 5,261,597 | 11/1993 | Perlman et al. | 236/93 |

FOREIGN PATENT DOCUMENTS

| | | | |
|---|---|---|---|
| 4-258794 | 9/1992 | Japan | 376/282 |

*Primary Examiner*—Daniel D. Wasil

[57] ABSTRACT

A primary coolant system of a nuclear power plant for providing coolant to a reactor vessel, the primary coolant system comprises a primary loop for transferring heat away from the reactor vessel. An accumulator tank for containing water under a pressurized, gaseous atmosphere is attached to the primary loop via a coupling, which provides an outlet for the coolant from the accumulator tank to pass to the primary loop. A valve, which includes a pressure sensor that senses the pressure in the accumulator tank and opens or closes the coolant flow in the coupling in response to the sensed pressure, is attached to the coupling for sensing the pressure in the accumulator tank. The valve senses the pressure in the accumulator, causes the coolant to pass substantially through the coupling at a substantially high flow rate when the pressure in the accumulator tank is relatively high and causes the coolant to pass from the accumulator tank to the circulation loop substantially through the coupling at a substantially low rate when the pressure in the accumulator tank is relatively low which, in turn, provides long term cooling of the reactor vessel.

7 Claims, 2 Drawing Sheets

PRIMARY COOLANT SYSTEM OF A NUCLEAR POWER PLANT FOR PROVIDING COOLANT TO A PRIMARY LOOP

BACKGROUND OF THE INVENTION

1. Field of the Invention

The invention relates generally to a primary coolant system of a nuclear power plant which provides coolant to a primary loop via an accumulator tank and, more particularly, to such a primary coolant system providing an initial high rate of flow to the primary loop and then providing a lower rate of flow for long term cooling of the primary loop.

2. Background of the Related Art

A typical nuclear power facility includes a nuclear reactor (typically pressurized to approximately 2250 psig) wherein a controlled nuclear reaction, which generates heat, is occurring. Typically, borated water is contained in the reactor for controlling the nuclear reaction process and for passing the heat away from the reactor. A primary loop communicating with the reactor functions to pass the borated water (i.e., the heat) away from the reactor and to transfer the heat to a secondary loop. The secondary loop is isolated from the primary loop and generates steam from the heat passed from the primary loop. The steam of the secondary loop is used to produce electricity as is well known in the art. The primary loop then returns the borated water back into the reactor where the above described process is repeated.

An accumulator tank, which is typically pressurized to approximately 800 psig, contains a coolant (typically borated water), and is attached to the primary loop for injecting coolant into the primary loop in the unlikely event of a break therein. A gas, usually nitrogen, is placed in the upper portion of the accumulator tank for maintaining a pressure in the tank. As is obvious to those skilled in the art, a break in the primary loop would cause the reactor vessel to overheat if the borated water, which transfers the heat away from the reactor vessel, is emptied from the primary loop and, in turn, the reactor vessel. The accumulator tank replenishes the coolant to the primary loop for mitigating, and possibly eliminating, this overheating.

One mechanism for injecting the coolant from the accumulator tank into the primary loop includes outlet piping attached between the accumulator tank and the reactor vessel. A valve, which is open during normal operation, and an orifice are both disposed in the outlet piping for respectively closing the outlet piping during planned maintenance of the reactor vessel and for controlling the flow of the coolant into the primary loop. A check valve, which allows flow in only one direction, is also disposed in the outlet piping and allows only the flow of the coolant into the primary loop, effectively eliminating any possibility of backflow of coolant from the primary loop into the accumulator tank during normal operation.

As will be obvious to those skilled in the art, since the reactor is at a higher pressure than the accumulator tank during normal operation, coolant does not flow from the accumulator tank into the primary loop. However if a break occurs in the primary loop, the primary loop will eventually be at a lower pressure than the accumulator tank. This allows the coolant in the accumulator tank to flow into the primary loop for replenishing the lost coolant.

Although the presently known and utilized system for injecting coolant into the primary loop if a break occurs therein is satisfactory, it is not without drawbacks. The coolant flows into the primary loop at a substantially high rate, and this causes the accumulator tank to empty at a fast rate. Therefore, long term cooling of the reactor vessel is minimal.

Consequently, a need exists for an improved primary cooling system of a nuclear power plant for providing coolant to the reactor vessel.

SUMMARY OF THE INVENTION

The present invention provides an improvement designed to satisfy the aforementioned needs. Particularly, the present invention is directed to A primary coolant system of a nuclear power plant for providing long term cooling of a reactor vessel, the primary coolant system comprising: a) a circulation loop for transferring heat away from the reactor vessel; b) an accumulator tank for containing water under a pressurized atmosphere; c) a coupling attached between said accumulator tank and said circulation loop for providing an outlet for a coolant from said accumulator tank to pass to said circulation loop; and d) a valve interposed on said coupling between said accumulator tank and said primary loop, and includes a pressure sensor associated with it that senses the pressure in said accumulator tank and opens or closes the coolant flow in the coupling in response to the sensed pressure; said valve senses the pressure in said accumulator, causes the coolant to pass substantially through said coupling at a substantially high flow rate when the pressure in said accumulator tank is relatively high and causes the coolant to pass from said accumulator tank to said circulation loop substantially through said coupling at a substantially low rate when the pressure in said accumulator tank is relatively low which, in turn, provides long term cooling of the reactor vessel.

It is an object of the present invention to provide a system which provides increased duration of cooling of the primary loop if a break occurs therein.

It is an feature of the present invention to provide a passively actuated valve attached to outlet piping for sensing the pressure in the accumulator tank for allowing the coolant to flow through the passively operated valve in direct correlation to the sensed pressure in the accumulator tank.

It is an advantage of the present invention to provide a passively operated valve without the need for human interaction during its operation.

These and other objects, features and advantages will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
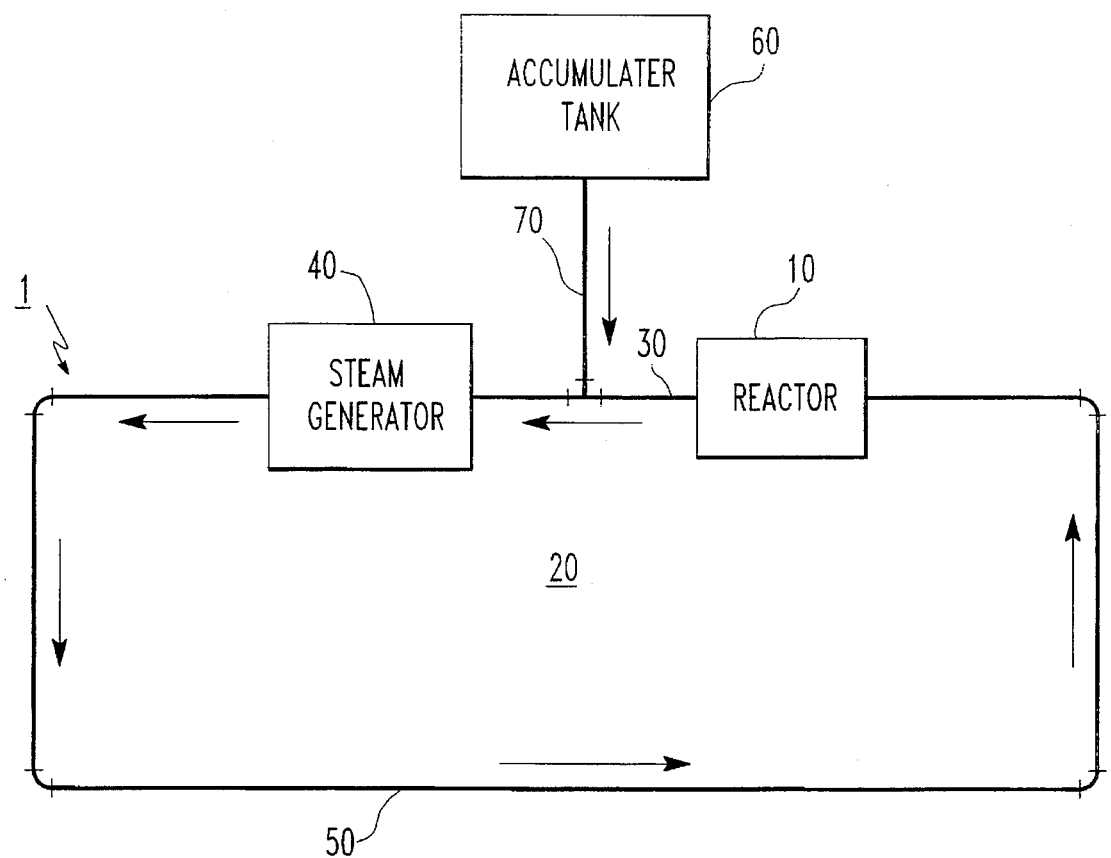
FIG. 1 is a schematic diagram of a portion of a pressurized water reactor nuclear power plant.

In the following description, like reference characters designate like or corresponding parts throughout several views of the drawings. Also in the following description, it is to be understood that such terms as "forward," "rearward," "right," "left," "upwardly," "downwardly," and the like are words of convenience and are not to be construed as limiting terms.

Referring now to FIG. 1, a portion of a nuclear plant facility, generally referred to as 1, is shown and contains a reactor vessel 10 for generating heat by nuclear reactions. The reactor vessel 10 is pressurized at a pressure of approximately 2250 psig. Typically, a primary coolant such as borated water (not shown) inside the reactor vessel 10 functions to control the nuclear reaction process and to convey the generated heat away from the reactor 10. The primary coolant in the reactor vessel 10 flows through a portion of a closed loop, generally referred to as a primary loop 20. Referring to such primary loop 20, the primary coolant flows out of the reactor vessel 10 through a pipe 30 to a steam generator 40 wherein the primary coolant, heated within the reactor vessel 10, transfers its heat to a water-filled secondary system (not shown). Steam is created in the steam generator 40 from water in the secondary system and is conveyed to a turbine-generator set (not shown) for producing electrical power, as is well known in the art. The primary coolant then exits the steam generator 40 via a pipe 50 and returns to the reactor vessel 10 to repeat the above described process.

In the unlikely event of a break or rupture of the primary loop 20, an accumulator tank 60, which is part of a safety injection system, is attached to the primary loop 20 via a pipe 70 for replenishing the lost primary coolant. The accumulator tank 60 contains a coolant, typically borated water, which is pressurized by nitrogen gas (typically 800 psig) disposed in the upper portion of the accumulator tank 60. The mechanism by which the accumulator tank injects the coolant into the primary loop 20 is discussed hereinbelow in detail.

Figure 2:
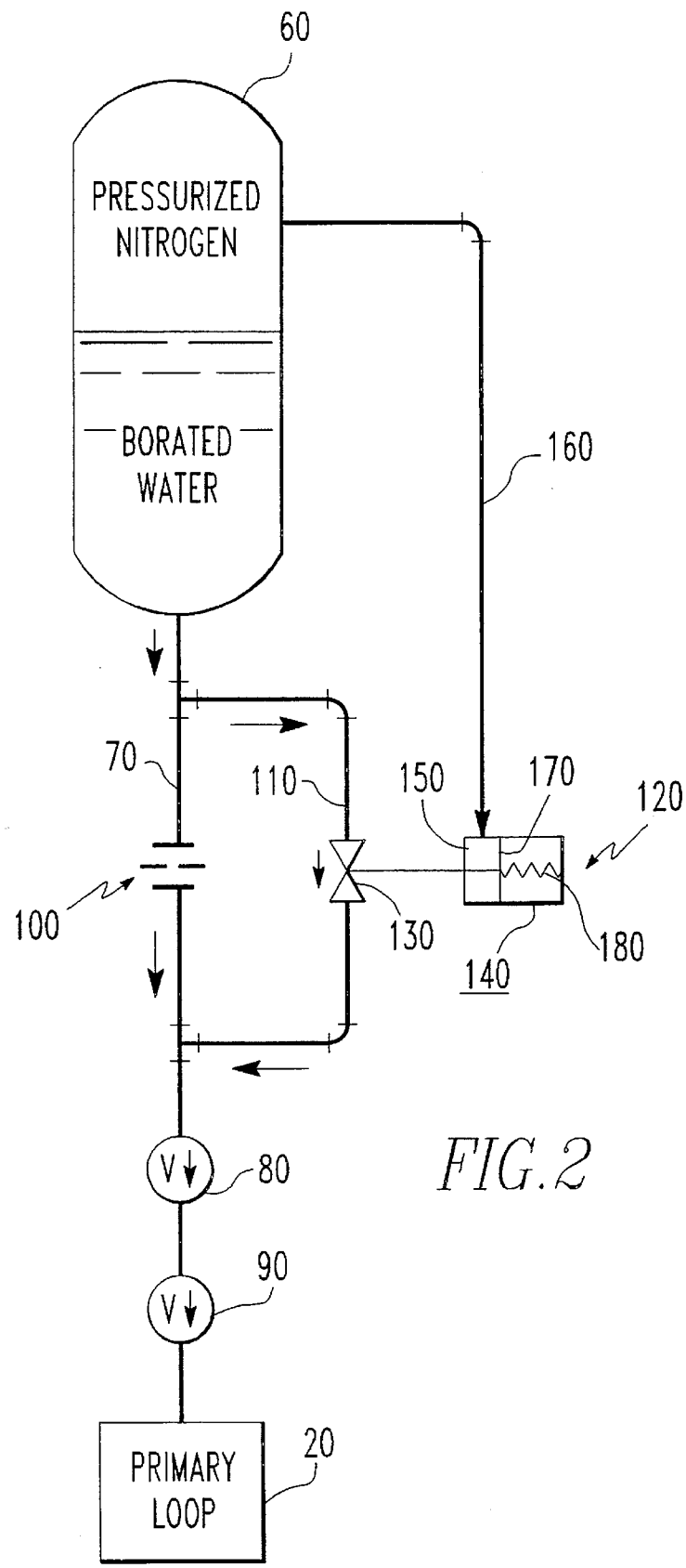
FIG. 2 is a schematic diagram of the system of the present invention for providing substantially long term cooling of the reactor if a break occurs in the primary loop.

In this regard and referring to FIG. 2, the pipe 70 contains two check valves 80 and 90 which permit flow in only one direction and which allow flow of the coolant into the primary loop 20, thereby preventing coolant from flowing from the primary loop 20 into the accumulator tank 60. There are two check valves 80 and 90 so that in case one malfunctions the other will still only allow flow in only one direction. Check valves 80 and 90 are well known in the art and are disclosed in detail in U.S. Pat. No. 5,172,888 which is assigned to the assignee of the present invention and which is hereby incorporated by reference. An orifice 100 is inserted into the pipe 70 for controlling the flow of the coolant into the primary loop 20.

A bypass pipeline 110 is attached to the pipe 70 for allowing the coolant to partially or totally circumvent passing through the orifice 100. To control the amount of coolant which flows through the bypass pipeline 110, a passively actuated valve 120 is positioned in the bypass pipeline 110. The passively actuated valve 120 includes a valve body 130 for providing a mechanical device for physically allowing or preventing flow through the valve 120. An actuator 140 is connected to the valve body 130 for providing a means for manipulating the opening or closing of the valve without human interaction. The actuator 140 contains a sensor 150 which is connected to the upper portion of the accumulator tank 60 via a pipe 160 for sensing the pressure in the accumulator tank 60. The sensor 150 is an open area bounded by the body of the actuator 140 and a plate 170 and is pressurized by the nitrogen gas positioned in the upper portion of the accumulator tank 60. It is instructive to note that the sensor 150 is at the same pressure as the accumulator tank 60. A spring 180 is placed in the actuator 140 opposite the sensor 150 for pressing against the plate 170. This pressing causes the sensor 150 to open or close the valve 120 accordingly. In this regard, when the spring 180 is in its completely compressed position, the valve 120 is completely open for allowing uninhibited flow therethrough. As the pressure in the sensor 150 decreases, the spring 180 will begin to uncoil which causes the valve 120 to close in direct correlation to the decompression of the spring 180. Eventually, when the pressure in the sensor 150 is below a predetermined amount, the spring 180 will completely close the valve 120.

The above described system works as follows, during normal operation, the primary loop 20 is at a higher pressure than the accumulator tank 60 and this, in essence, prevents the accumulator tank 60 from supplying its borates water into the primary loop 20. The check valves 80 and 90 supplement preventing the primary coolant from flowing into the accumulator tank 60. If a rupture occurs in the primary loop 20, the primary loop 20 pressure eventually drops below the pressure in the accumulator tank 60. This allows the accumulator tank 60 to replenish the primary loop 20 with its contents via the pipe 70 and bypass pipe 110. When the rupture first occurs, the pressure in the accumulator tank 60 is approximately 800 psig and the sensor 150 forces the spring into its completely compressed position for completely opening the valve 120. The valve 120 offers less resistance than the orifice 100, and the majority of the flow of the coolant passes through the valve 120. This allows the initial surge of the coolant into the primary loop 20 at a relatively high rate. As more coolant flows into the primary loop 20, the pressure in the accumulator tank 60 begins to drop which obviously causes the sensor 150 to lose pressure. As a result, the spring 180 begins to uncoil and presses against the plate 170 which compresses the sensor 150. As a result, the valve body 130 closes which limits flow therethrough in direct correlation to the compression of the sensor 150. Eventually, the pressure in the accumulator tank 60 will drop below a predetermined point so that the spring 180 completely compresses the sensor 150, thereby closing the valve 120. At this point all the coolant flows through the orifice 100 at a relatively slow rate. The result is long term cooling of the primary loop 20 for allowing operators better opportunity to cease the heat production process in the reactor vessel 10.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinabove described being merely a preferred or exemplary embodiment thereof.

We claim:

1. A primary coolant system of a nuclear power plant for providing long term cooling of a reactor vessel, the primary coolant system comprising:

a) a circulation loop for transferring heat away from the reactor vessel;

b) an accumulator tank for containing water under a pressurized atmosphere;

c) a coupling attached between said accumulator tank and said circulation loop for providing an outlet for a coolant from said accumulator tank to pass to said circulation loop; and d) a valve interposed on said coupling and disposed between said accumulator tank and said primary loop, and includes a pressure sensor associated with it that senses the pressure in said accumulator tank and changes the coolant flow in the coupling in response to the sensed pressure such that said valve causes the coolant to pass through said coupling at a first flow rate when the pressure in said accumulator tank is at a first sensed pressure and causes the coolant to pass from said accumulator tank to said circulation loop through said coupling at a second flow rate lower than the first flow rate when the sensed pressure in said accumulator tank is lower than the first sensed pressure which, in turn, provides long term cooling of the reactor vessel.

2. A primary coolant system of a nuclear power plant for providing long term cooling of a reactor vessel the primary coolant system comprising:

a) a circulation loop for transferring heat away from the reactor vessel;

b) an accumulator tank for containing water under a pressurized atmosphere;

c) a coupling attached between said accumulator tank and said circulation loop for providing an outlet for a coolant from said accumulator tank to pass to said circulation loop; and d) a valve interposed on said coupling and disposed between said accumulator tank and said primary loop, and includes a pressure sensor associated with it that senses the pressure of said accumulator tank and changes the coolant flow in the coupling in response to the sensed pressure such that said valve causes the coolant to pass through said coupling at a first flow rate when the pressure in said accumulator tank is at a first sensed pressure and causes the coolant to pass from said accumulator tank to said circulation loop through said coupling at a second flow rate lower than the first flow rate when the sensed pressure in said accumulator tank is lower than the first sensed pressure which, in turn, provides long term cooling of the reactor vessel; and wherein said coupling includes a pipeline which branches into a first and second portion at its middle portion, and the first and second portions merge into a single flow path at both its end portions.

3. The primary coolant system as in claim 2, wherein the second portion includes said valve disposed therein for allowing the coolant from said accumulator tank to flow substantially through the second portion when the pressure in said accumulator tank is relatively high and for allowing the coolant from said accumulator tank to flow substantially through the first portion when the pressure in said accumulator tank is relatively low.

4. The primary coolant system as in claim 3 further comprising an orifice disposed in the first portion and positioned between said accumulator tank and said primary loop for controlling the flow of the coolant through said coupling.

5. The primary coolant system as in claim 4, wherein said valve includes a spring for closing said valve.

6. The primary coolant system as in claim 5 further comprising a check valve positioned in said coupling for preventing the coolant in the reactor vessel from flowing into said accumulator tank when pressure in the reactor vessel is higher than the pressure in said accumulator tank.

7. A primary coolant system of a nuclear power plant for providing long term cooling of a reactor vessel, the primary coolant system comprising:

a) a circulation loop for transferring heat away from the reactor vessel;

b) an accumulator tank for containing water under a pressurized atmosphere;

c) a coupling attached between said accumulator tank and said circulation loop for providing an outlet for a coolant from said accumulator tank to pass to said circulation loop; and d) a valve, said valve interposed on a pipe in operative association with said coupling and disposed between said accumulator tank and said primary loop, which includes a pressure sensor associated with it that senses the pressure in said accumulator tank and changes the coolant flow in the coupling in response to the sensed pressure for causing the flow through said coupling and the pipe to vary in direct correlation with the sensed pressure.

* * * * *